United States Patent
Lin

(10) Patent No.: US 12,339,161 B2
(45) Date of Patent: Jun. 24, 2025

(54) AMBIENT LIGHT SENSING METHOD AND AMBIENT LIGHT SENSOR

(71) Applicant: SENSORTEK TECHNOLOGY CORP., Hsinchu County (TW)

(72) Inventor: Yu-Min Lin, Hsinchu County (TW)

(73) Assignee: SENSORTEK TECHNOLOGY CORP., Hsinchu County (TW)

( * ) Notice: Subject to any disclaimer, the term of this patent is extended or adjusted under 35 U.S.C. 154(b) by 0 days.

(21) Appl. No.: 18/129,908

(22) Filed: Apr. 3, 2023

(65) Prior Publication Data

US 2024/0019297 A1   Jan. 18, 2024

Related U.S. Application Data

(60) Provisional application No. 63/326,447, filed on Apr. 1, 2022.

(51) Int. Cl.
*G01J 1/42* (2006.01)
*G01J 1/04* (2006.01)
*G02B 5/20* (2006.01)

(52) U.S. Cl.
CPC ........... *G01J 1/4204* (2013.01); *G01J 1/0488* (2013.01); *G02B 5/208* (2013.01)

(58) Field of Classification Search
CPC ........ G01J 1/4204; G01J 1/0488; G02B 5/208
See application file for complete search history.

(56) References Cited

U.S. PATENT DOCUMENTS

| | | | | |
|---|---|---|---|---|
| 6,760,475 B1 * | 7/2004 | Miller | .................... | H04N 23/84 |
| | | | | 359/578 |
| 10,996,105 B2 * | 5/2021 | Nagaya | .................... | G02B 1/04 |
| 2003/0218123 A1 * | 11/2003 | Harada | .................... | G02B 5/22 |
| | | | | 250/226 |
| 2015/0160386 A1 * | 6/2015 | Takemura | .............. | G02B 5/283 |
| | | | | 359/359 |
| 2019/0137670 A1 | 5/2019 | Nagaya et al. | | |

FOREIGN PATENT DOCUMENTS

JP    2018164153 A    * 10/2018

OTHER PUBLICATIONS

Taiwan Intellectual Property Office, Official action References Search report, Taiwan patent application on Apr. 30, 2024.

* cited by examiner

*Primary Examiner* — Georgia Y Epps
*Assistant Examiner* — Monica T Taba
(74) *Attorney, Agent, or Firm* — WPAT, PC

(57) ABSTRACT

The present invention provides an ambient light sensing method and an ambient light sensor. The ambient light sensing method comprises a light sensing device sensing the light passing through an optical filter and giving an optical signal value, and an operational unit receiving the optical signal value and calculating an ambient light illuminance value according to the optical signal value. Accordingly, the ambient light sensing method and the ambient light sensor according to the present invention can give the ambient light illuminance value with more accuracy and ensure low influence of opaque ink on ambient light sensing.

10 Claims, 9 Drawing Sheets

AMBIENT LIGHT SENSING METHOD AND AMBIENT LIGHT SENSOR

BACKGROUND OF THE INVENTION

Light sensors implemented by the sensing technology are widely applied to many applications. In particular, ambient light sensors (ALS) can be applied to electronic products to sense the intensity of ambient light for adjusting the brightness of displays and thus enhance usage convenience as well as extend battery life.

In the primary applications of ambient light sensors, the sensing result should be able to represent the intensity of the visible light as sensed by human eyes. Thereby, a light sensor with bandpass filter will be generally adopted for making the response spectrum of the light receiving device close to the CIE-Y function. When the ambient light illuminates this light sensor, the relative illuminance will be equivalent or highly related to the value as seen by human eyes.

Nonetheless, for aesthetic considerations, modern mobile electronic devices are developed toward the trend of full screen without holes. In order to hide the light sensor below the panel glass, the glass will be coated with ink, which will block visible light from transmission and appear roughly black to cover the light sensor. Please refer to FIG. 1, which shows a schematic diagram of the proportion of the light passing through an exemplary ink. The proportion of the light passing through the ink will be significantly influenced.

In this case, please refer to FIG. 2, which shows a response diagram of the light sensor for light with different wavelengths. The curve C1 is the response spectrum designed for complying with the CIE-Y function of human eyes. Nonetheless, when the ambient light is received by the light sensor through the ink as described above, the relative response spectrum is distorted apparently, as the curve C2 shown in the figure. The difference will lower the correlation between the reading of the light sensor and the relative illuminance sensed by human eyes and hence reducing estimation accuracy for illuminance.

Although the light sensor can be calibrated individually to improve estimation accuracy for illuminance, in practice, the actual conditions under which a light sensor must operate encompass a wide range of environmental light sources. Not to mention, the types of inks utilized vary among electronic products from different brands. These make the calibration difficult, and it is hard for the compensated result to meet all application conditions.

Accordingly, the ambient light sensor and its sensing method according to the prior art should be improved. Nonetheless, light sensors are sensitive to costs. If the improved proposal requires excessive components for enhancing the sensing accuracy, it is still not applicable in the market.

SUMMARY OF THE INVENTION

An objective of the present invention is to provide an ambient light sensing method and an ambient light sensor applicable to disposing the ambient light sensor below the panel glass coated with ink. By proper disposition of an optical filter, the light sensing characteristics of the light sensing device can be adjusted and the error range of the generated illuminance values of the ambient light can be controlled effectively. By substantially increasing estimation accuracy for illuminance, the influence of the ink on ambient light sensing can be minimized.

The present invention provides an ambient light sensing method, which comprises: a light sensing device sensing the light passing through an optical filter and giving an optical signal value; and an operational unit receiving the optical signal value and calculating an ambient light illuminance value according to the optical signal value. The optical filter is disposed to make a valid light-sensing wavelength range of the light sensing device include 590 nm~630 nm and an invalid light-sensing wavelength range of the light sensing device be above 700 nm.

The present invention also provides an ambient light sensor, which comprises a light sensing unit and an operational unit. The light sensing unit includes a light sensing device and an optical filter. The optical filter covers the light receiving region of the light sensing device. The light sensing device senses the light passing through the optical filter and gives an optical signal value. The operational unit is coupled to the light sensing device for receiving the optical signal value and calculating an ambient light illuminance value according to the optical signal value. The optical filter is disposed to make a valid light-sensing wavelength range of the light sensing device include 590 nm~630 nm and an invalid light-sensing wavelength range of the light sensing device be above 700 nm.

DETAILED DESCRIPTION OF THE INVENTION

In the specifications and subsequent claims, certain words are used to represent specific devices. A person having ordinary skill in the art should know that hardware manufacturers might use different phrases to call the same device. In the specifications and subsequent claims, the differences in names are not used for distinguishing devices. Instead, the differences in functions are the guidelines for distinguishing. In the whole specifications and subsequent claims, the word "comprising" is an open language and should be explained as "comprising but not limited to". Besides, the word "couple" includes any direct and indirect electrical connection. Thereby, if the description is that a first device is coupled to a second device, it means that the first device is connected electrically to the second device directly, or the first device is connected electrically to the second device via other device or connecting means indirectly.

Figure 1:
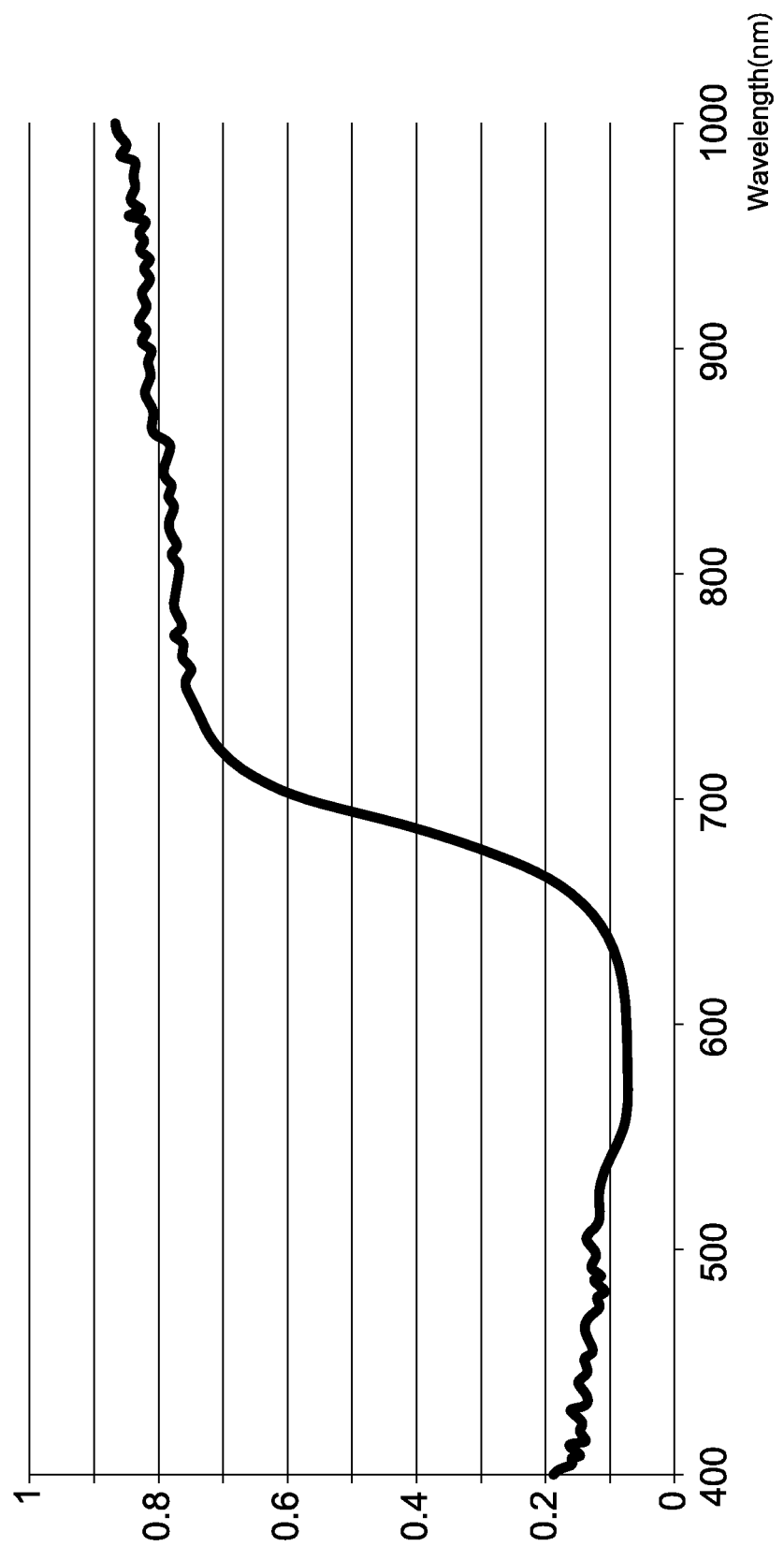
FIG. 1 shows a schematic diagram of the proportion of the light passing through an exemplary ink.
Figure 2:
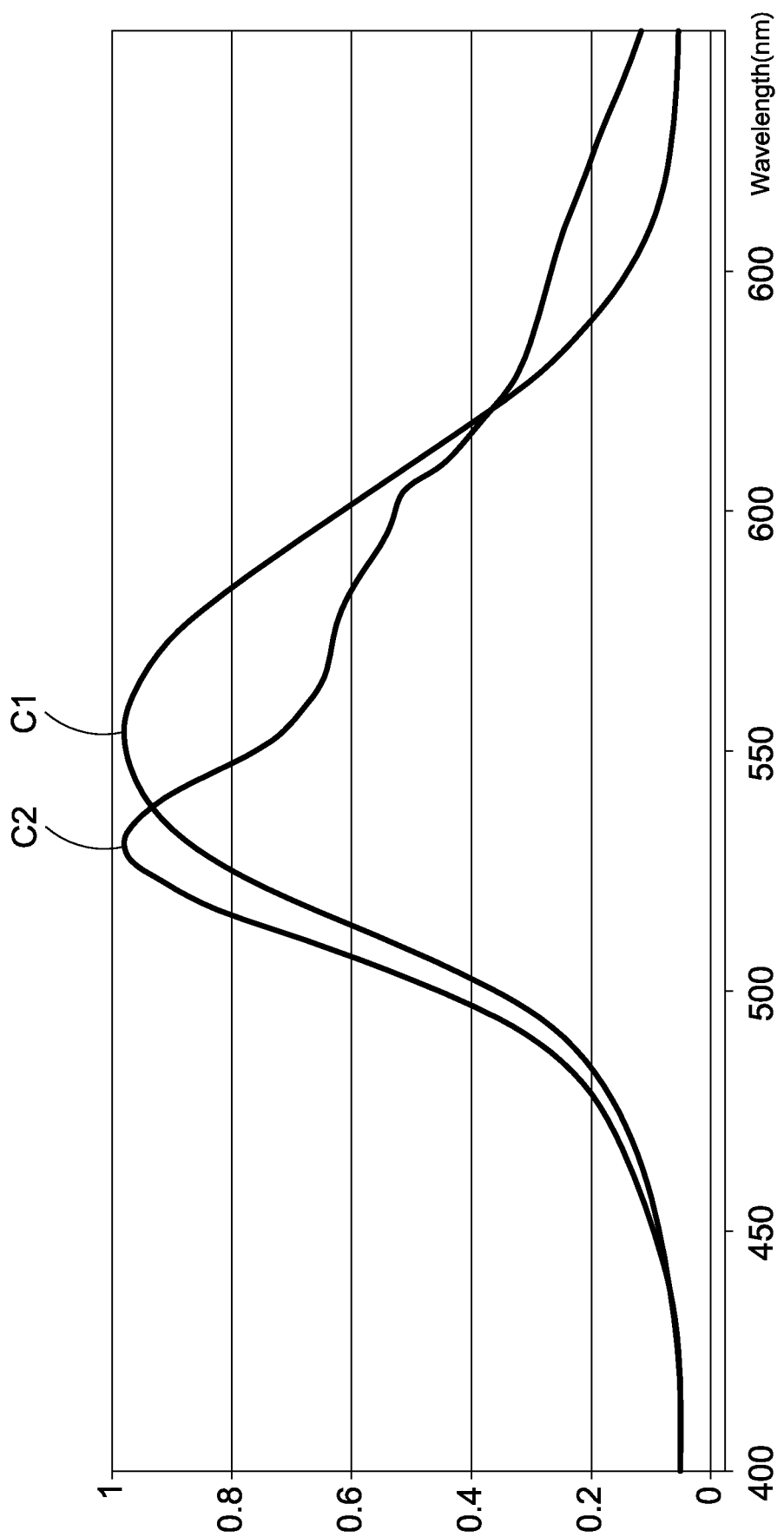
FIG. 2 shows a response diagram of the light sensor for light with different wavelengths.
Figure 3:
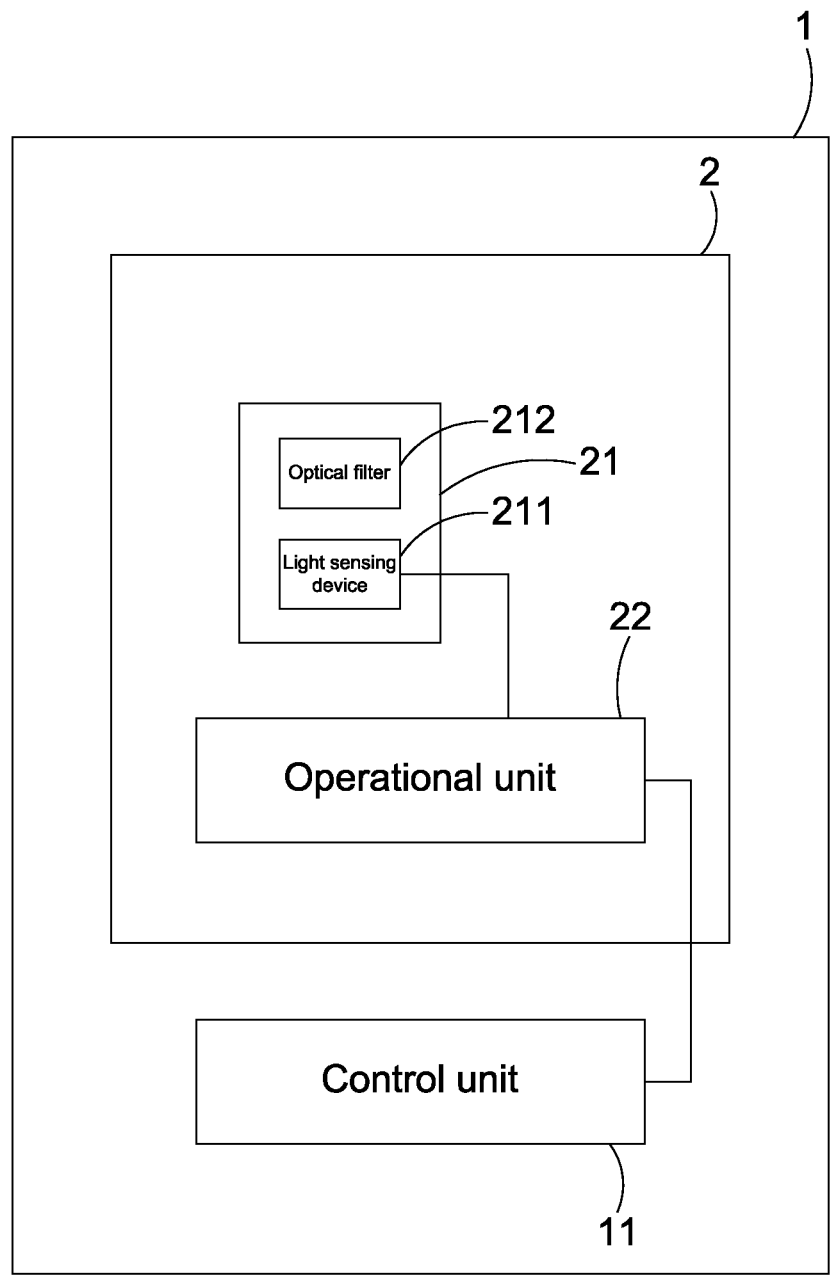
FIG. 3 shows a schematic diagram of the sensing architecture of the ambient light sensing method according to an embodiment of the present invention.

Please refer to FIG. 3, which shows a schematic diagram of the sensing architecture of the ambient light sensing method according to an embodiment of the present invention. In the following, an electronic device 1 will be taken as an example. The electronic device 1 can be any mobile electronic device such as a mobile phone. The electronic device 1 can include an ambient light sensor 2 according to an embodiment of the present invention for forming a sensing architecture capable of executing the ambient light sensing method according to the present invention. The electronic device 1 includes a control unit 11, which is coupled to the ambient light sensor 2 for controlling its operations. Alternatively, the control unit 11 receives an ambient light illuminance value output by the ambient light sensor 2. The ambient light illuminance value can be used as a reference baseline for adjusting the brightness of the display. The ambient light sensor 2 comprises a light sensing unit 21 and an operational unit 22. The light sensing unit 21 includes a light sensing device 211 and an optical filter 212. The light sensing device 211 can include an optoelectronic diode or other light sensing structures. The optical filter 212 covers the light receiving region of the light sensing device 211. The optical filter 212 can change the light sensing characteristics of the light sensing device 211. The operational unit 22 is coupled to the light sensing device 211 for receiving an optical signal value sensed by the light sensing device 211 and calculating to give the ambient light illuminance value.

The optical filter 212 can be formed by stacking different materials on the light sensing device 211. For example, the optical filter 212 can be fabricated by disposing a single layer or multiple layers of film, coating, or optical microstructure. Alternatively, the optical filter 212 can be formed by doping dyes in the original structure of the light sensing device 211, such as lenses. Of course, the optical filter 212 can be a combination of the above two structures.

Figure 4:
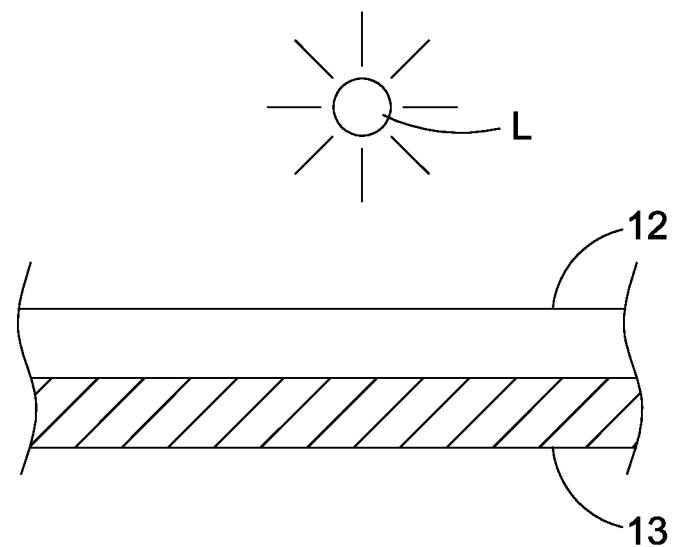
FIG. 4 shows a schematic diagram of the operations of the light sensor according to an embodiment of the present invention.
Figure 4:
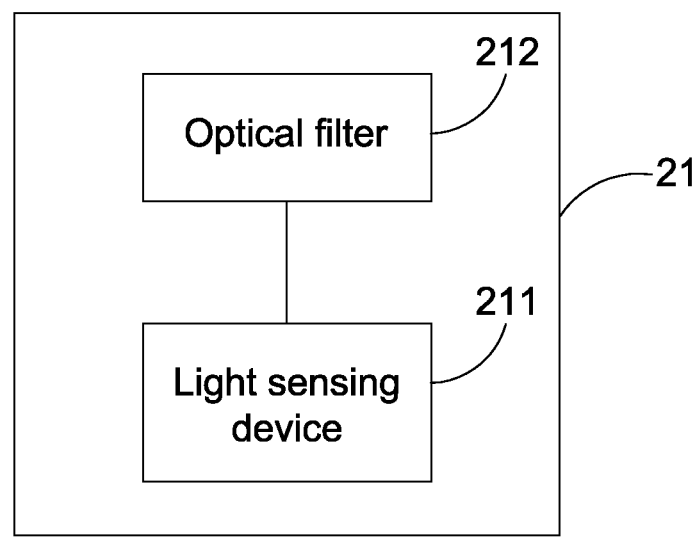
Figure 5:
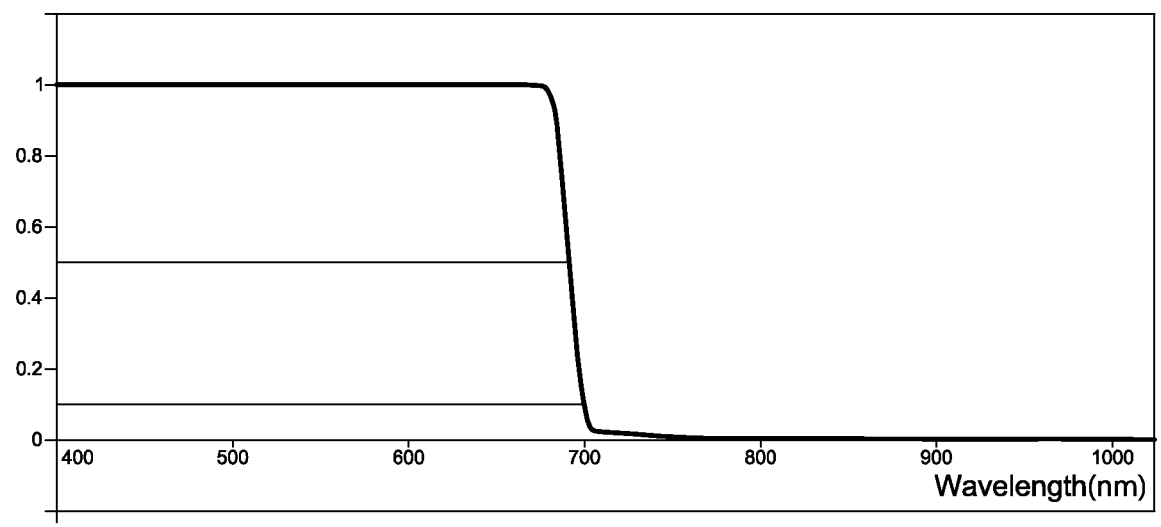
FIG. 5 shows the light sensing characteristics of a first light sensing device according to an embodiment of the present invention.
Figure 6:
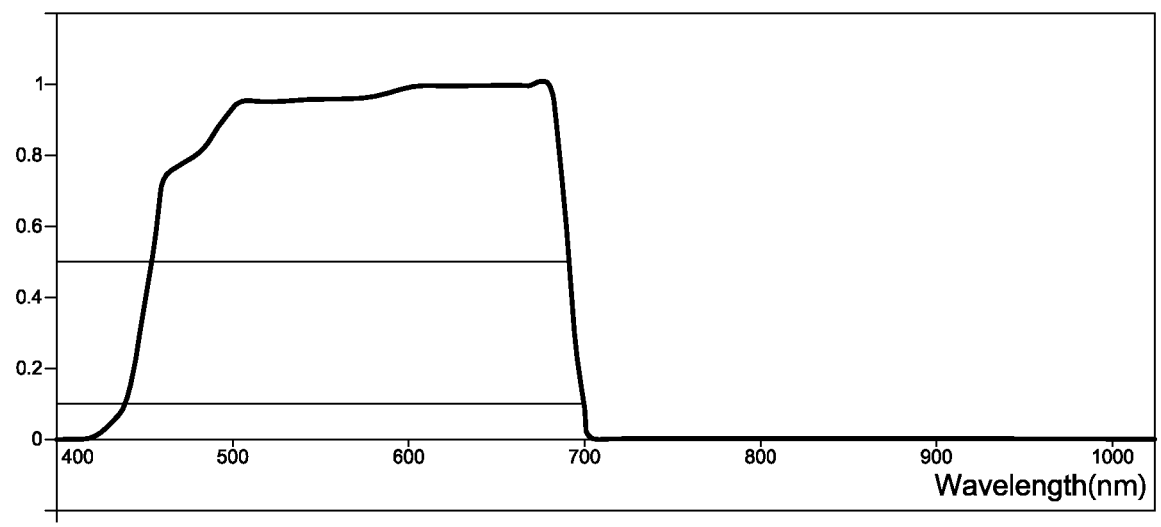
FIG. 6 shows the light sensing characteristics of a second light sensing device according to an embodiment of the present invention.
Figure 7:
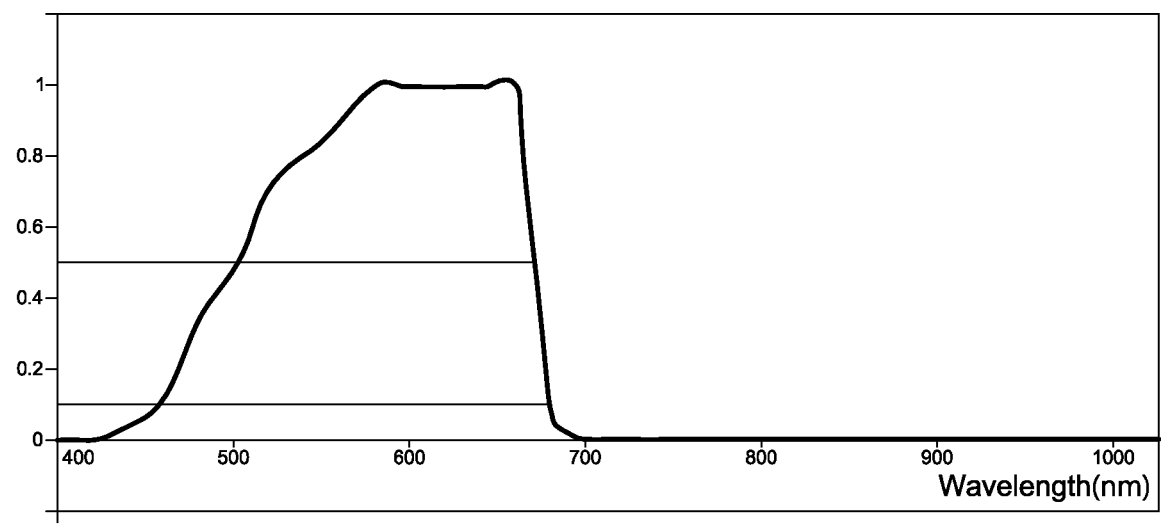
FIG. 7 shows the light sensing characteristics of a third light sensing device according to an embodiment of the present invention.

Please refer to FIG. 4, which shows a schematic diagram of the operations of the light sensor according to an embodiment of the present invention. The electronic device 1 can be a full-screen display. Thereby, the light sensor 2 is disposed below a panel glass 12 of the electronic device 1. As described above, to hide the light sensor 2, the panel glass 12 will be generally coated with a layer or multiple layers of ink 13. Thereby, the light of the ambient light L must penetrate the ink 13 and the optical filter 212 before being sensed by the light sensing device 211. According to the embodiment of the ambient light sensing method and the ambient light sensor, the optical filter 212 is adopted to make the light sensing device 211 have the following light sensing characteristics and thus enhance the estimation accuracy for illuminance.

Please refer to FIG. 5 to FIG. 9, which show the light sensing characteristics (namely, the relative response intensity of the light device 211 for different wavelengths) of five light sensing devices capable of enhancing estimation accuracy for illuminance. To illustrate various features of the light sensing characteristics, the valid light-sensing wavelength range described in the present specification refers to the wavelength range with the relative response intensity of the light sensing device 211 greater than 40% and preferably greater than 50%; the invalid light-sensing wavelength range described in the present specification refers to the wavelength range with the relative response intensity of the light sensing device 211 less than 20% and preferably less than 10%. The relative response intensity means the ratio between the light response intensity sensed by the light sensing device 211 and the sensing result of the light sensing device 211 when the light does not pass the optical filter 212.

The common feature of the five embodiments shown in FIGS. 5 to 9 is that the valid light-sensing wavelength range of the light sensing device 211 includes 590 nm~630 nm and the invalid light-sensing wavelength range of the light sensing device 211 is above 700 nm. For example, for the fifth light sensing device, the valid light-sensing wavelength range of the light sensing device 211 includes 590 nm~630 nm.

Furthermore, since the valid light-sensing wavelength range at least reaches 630 nm and the invalid light-sensing wavelength range starts from 700 nm, the relative response intensity of the light sensing device 211 will change rapidly between 630 nm and 700 nm. Please refer to FIG. 8 for the fourth light sensing device. The relative response intensity of the light sensing device decreases progressively from 630 nm to 700 nm. If the unit of the horizontal axis is nanometer (nm), the slope of the line S connecting the point with 90% relative response intensity and the one with 10% will be less than −0.01067. For the other four light sensing devices, the decreasing level of the relative response intensity between 630 nm and 700 nm are even more abrupt (and thereby smaller slopes of the lines S). There is another simple method to represent the variation of the relative response intensity between 630 nm and 700 nm. Likewise, take the fourth light sensing device for example. The range R between the wavelength with 90% relative response intensity and the one with 10% relative response intensity is less than 75 nm. For the other four light sensing devices, this range R will be narrower.

The ambient light sensing method and the ambient light sensor according to the embodiments of the present invention use the rapid variation of the relative response intensity of the light sensing device 211 between 630 nm and 700 nm to overcome the distortion in the relative response intensity caused by the ink according to the prior art. The distortion will lower the correlation between the reading of the light sensor and the relative illuminance sensed by human eyes.

According to the embodiments of the ambient light sensing method and the ambient light sensor of the present invention, the light sensing device 211 receives the light passing through the ink 13 and the optical filter 212. The optical filter 212 is designed to make the light sensing characteristics of the light sensing device 211 include at least the above features. Then the operational unit 22 receives the sensing results of the light sensing device 211 and calculates to give the ambient light illuminance values. The differences between various light sensing devices will be described in brief as follows.

Figure 8:
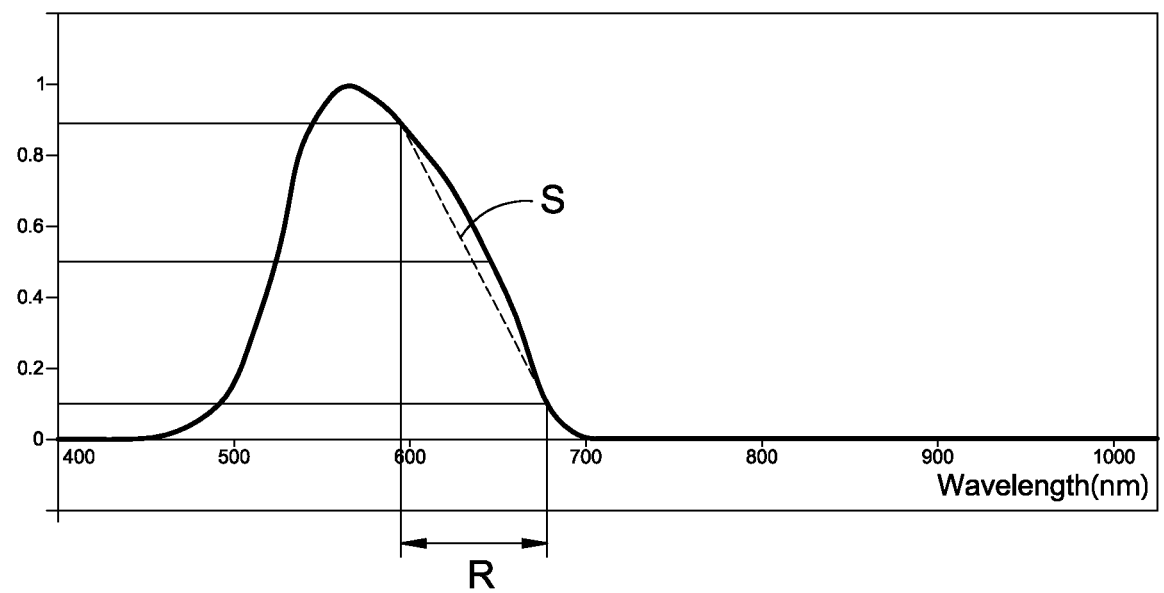
FIG. 8 shows the light sensing characteristics of a fourth light sensing device according to an embodiment of the present invention.
Figure 9:
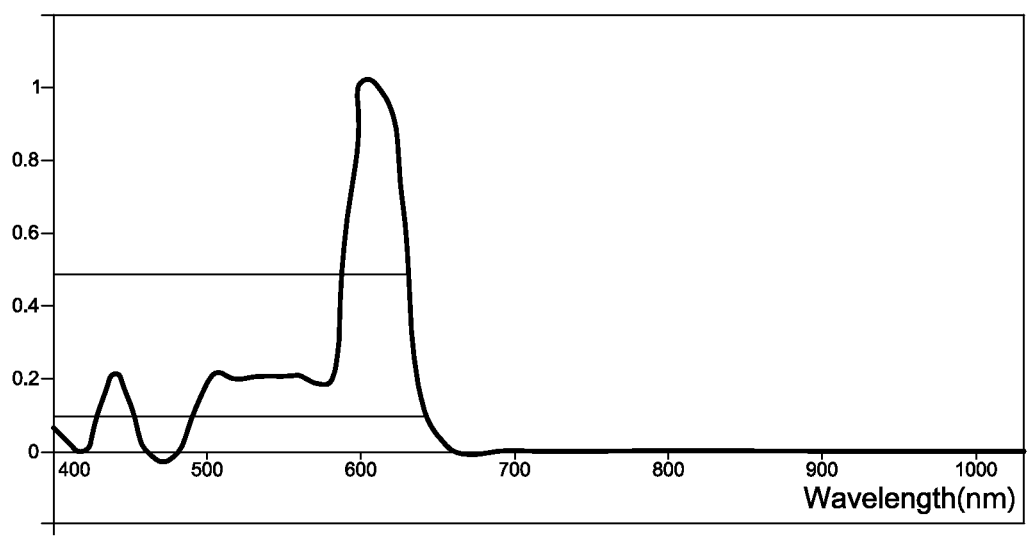
FIG. 9 shows the light sensing characteristics of a fifth light sensing device according to an embodiment of the present invention.

In the fourth light sensing device shown in FIG. 8, the valid light-sensing wavelength range of light sensing device 211 includes 520 nm~650 nm. In the third light sensing device shown in FIG. 7, the valid light-sensing wavelength range of light sensing device 211 includes 500 nm~660 nm. In the second light sensing device shown in FIG. 6, the valid light-sensing wavelength range of light sensing device 211 includes 450 nm~690 nm. In the first light sensing device shown in FIG. 5, the valid light-sensing wavelength range of light sensing device 211 includes 400 nm~690 nm. In the fifth light sensing device shown in FIG. 9, the valid light-sensing wavelength range of light sensing device 211 includes a discontinuous wavelength range. Nonetheless, it does not influence the technical effect of enhancing the estimation accuracy for illuminance.

The above five embodiments of light sensing device can effectively implement the ambient light sensing method and the ambient light sensor according to the present invention and achieve the purpose of improving estimation accuracy for illuminance. Nonetheless, for brevity, the measurement result of the fourth sensing device will be illustrated first.

The ambient light source L can be chosen to be the incandescent light "A", the horizontal sunlight "HZ", and the emulated sunlight "D65". In practice, the applicants of the present invention also measure other light sources. Due to space limitation, further details will not be listed. The practical illuminance of the ambient light source L is controlled to be identical. The so-called practical illuminance can be given by directly measuring the light emitted from the ambient light source L using a standard lux meter. The light sensing device 211 receives the light passing through the ink and the optical filter 212. Then the operational unit 22 receives the sensing result of the light sensing device 211 and calculates to give the ambient light illuminance value and its error. Likewise, place the ambient light sensor designed according to the CIE-Y function of human eyes according to the prior art below the ink for receiving the light passing through the ink and scale the sensing result proportionally to give the ambient light illuminance value and its error. The above results are compared in Table 1, where "Ink H", "Ink M", and "Ink L" are three ink environments with different thicknesses (or concentrations). These test conditions are designed considering process errors in coating ink and different ink thicknesses or concentrations for different models.

TABLE 1

| Test Condition | Practical Illuminance | Reading of Present Invention | Error | Reading of Prior Art | Error |
|---|---|---|---|---|---|
| D65(Ink_H) | 1000 | 944.8 | −5.52 | 1002.1 | 7.57 |
| D65(Ink_M) | 1000 | 960.7 | −3.93 | 1022.8 | 9.77 |
| D65(Ink_L) | 1000 | 1011.4 | 1.14 | 1203.9 | 17.59 |
| A(Ink_H) | 1000 | 950.6 | −4.94 | 879.6 | −7.98 |
| A(Ink_M) | 1000 | 976.7 | −2.33 | 894.9 | −5.11 |
| A(Ink_L) | 1000 | 1065.2 | 6.52 | 1151.7 | 6.01 |
| HZ(Ink_H) | 1000 | 961.5 | −3.85 | 759.6 | −11.22 |
| HZ(Ink_M) | 1000 | 994.7 | −0.53 | 756.5 | −7.21 |
| HZ(Ink_L) | 1000 | 1109.1 | 10.91 | 1109.4 | 8.78 |

It can be seen from Table 1 that the errors of the ambient light illuminance values according to the ambient light sensing method and the ambient light sensor according to the present invention can be controlled within ±10% approximately. On the contrary, the errors according to the prior art have already seriously influenced the estimation accuracy for illuminance. Even individual calibration and compensation are performed, for example, on the light source condition of D65 (Ink L), the compensated light sensor is not applicable to other test conditions, letting along various ambient light sources L in practice.

It can be seen from Table 1 that the errors of the ambient light illuminance values according to the ambient light sensing method and the ambient light sensor according to the present invention can be controlled within ±10% approximately. On the contrary, the errors according to the prior art have already seriously influenced the estimation accuracy for illuminance. Even individual calibration and compensation are performed, for example, on the light source condition of D65 (Ink L), the compensated light sensor is not applicable to other test conditions, letting along various ambient light sources L in practice.

A person having ordinary skill in the art can understand that the function of a modern light sensor is complicated. A light sensing unit used for executing other function might be disposed. Thereby, under the condition of not influencing the overall costs of a light sensor, the ambient light sensing method and the ambient light sensor according to the present invention can introduce the sensing results of other light sensing units for facilitating estimating the ambient light illuminance value. For example, if the electronic device 1 include a light sensing unit without any optical filter in the ambient light sensor 2 or other light sensors, the detectable wavelength range can be broadened effectively (such as including 400 nm~800 nm). The sensing results can be used to calibrate the ambient light illuminance values generated by the operational unit 22. An exemplary result can be shown in Table 2 below. In practice, it is normal that the electronic device 1 further includes a light sensing unit with a wide wavelength range, an infrared wavelength range, or a wavelength range of a specific color. The person applying the present invention can determine whether to introduce the sensing results of other light sensing units to facilitate estimating the ambient light illuminance value according to the practical application.

TABLE 2

| Test Condition | Practical Illuminance | Reading of Present Invention (Calibrated) | Error | Reading of Prior Art | Error |
|---|---|---|---|---|---|
| D65(Ink_H) | 1000 | 995.1 | −0.49 | 1002.1 | 7.57 |
| D65(Ink_M) | 1000 | 1005.3 | 0.53 | 1022.8 | 9.77 |
| D65(Ink_L) | 1000 | 1033.0 | 3.30 | 1203.9 | 17.59 |
| A(Ink_H) | 1000 | 985.5 | −1.45 | 879.6 | −7.98 |
| A(Ink_M) | 1000 | 999.1 | −0.09 | 894.9 | −5.11 |
| A(Ink_L) | 1000 | 1039.0 | 3.90 | 1151.7 | 6.01 |
| HZ(Ink_H) | 1000 | 967.6 | −3.24 | 759.6 | −11.22 |
| HZ(Ink_M) | 1000 | 976.2 | −2.38 | 756.5 | −7.21 |
| HZ(Ink_L) | 1000 | 994.7 | −0.53 | 1109.4 | 8.78 |

It can be seen from Table 2 that the error can be controlled within ±5% by applying the ambient light sensing method and the light sensor according to the present invention and introducing the sensing results of other light sensing units to estimate the ambient light illuminance value. In practice, the sensing result of the existing light sensing unit is adopted. In addition to calibration calculations, the overall cost is almost not influenced.

More importantly, in the above exemplary description, only one type of ink is considered. However, in practical situations, the electronic devices produced by different manufacturers generally will adopt different types of ink. Please refer to Table 3 below. It can be observed that, except "Ink_6", the errors of the prior art cannot be controlled within approximately ±10%. Contrarily, the error of each type of ink according to the present invention can be controlled effectively within approximately ±10%. It is apparent that the present invention can enhance the estimation accuracy for illuminance significantly.

TABLE 3

| | Error of Present Invention | | | Error of Prior Art | | |
|---|---|---|---|---|---|---|
| Ink | D65 | A | HZ | D65 | A | HZ |
| Ink_1 | 4.75 | 1.36 | −2.78 | 17.59 | 6.01 | 8.78 |
| Ink_2 | 7.13 | 7.24 | 4.64 | 19.20 | 9.43 | 13.64 |

TABLE 3-continued

| Ink | Error of Present Invention | | | Error of Prior Art | | |
|---|---|---|---|---|---|---|
| | D65 | A | HZ | D65 | A | HZ |
| Ink_3 | 6.57 | 2.74 | 1.55 | 17.06 | −4.76 | −8.78 |
| Ink_4 | −1.31 | −2.56 | −3.64 | 4.16 | −9.16 | −12.31 |
| Ink_5 | 4.34 | 1.30 | 0.51 | 12.54 | −6.89 | −11.07 |
| Ink_6 | −0.43 | 2.72 | 3.61 | 4.76 | −6.02 | −8.17 |
| Ink_7 | 2.62 | −4.80 | −7.59 | 9.23 | −10.89 | −16.01 |
| Ink_8 | 2.10 | −0.13 | −3.76 | 14.02 | 1.70 | 3.09 |

In fact, even for the same manufacturer, different products or samples will usually adopt different types of ink. Besides, different thicknesses or concentrations might be applied to the same ink. The applicants of the present invention also measure different ink conditions. Due to space limitation, the details will not be listed. This illustrated that using individual calibration for enhancing estimation accuracy for illumination according to the prior art will lead to extra burdens in the process of product development and fabrication. It can be seen that the ambient light sensing method and the ambient light sensor according to the present invention are truly commercially valuable.

To sum up, according to the ambient light sensing method and the ambient light sensor according to the present invention, only one optical filter is required to adjust the light sensing characteristics of the light sensing device and control the error effectively. Compared to the prior art, the present invention indeed can significantly enhance the estimation accuracy for illumination. In other words, the ambient light sensing method and the ambient light sensor according to the present invention can be disposed below the panel glass coated with ink for enduring sensing accuracy for ambient light. In addition, its influence on the costs of light sensor is negligible, making it highly valuable in the market.

It can be confirmed by practical measurements that the ambient light sensing method and the ambient light sensor according to the present invention own excellent error control for various ambient light or ink conditions. In contrast, according to the prior art, individual calibration for light sensors is required to improve estimation accuracy for illumination. Accordingly, the present invention provides high utility and commercial value.

The foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. An ambient light sensing method, comprising:
a light sensing device sensing the light passing through an optical filter and giving an optical signal value; and
an operational unit receiving said optical signal value and calculating an ambient light illuminance value according to said optical signal value;
where said optical filter is disposed to make a valid light-sensing wavelength range of said light sensing device include 450 nm to 690 nm and an invalid light-sensing wavelength range of said light sensing device be above 700 nm, wherein said valid light-sensing wavelength range refers to the wavelength range with the relative response intensity of said light sensing device greater than 40%; and said invalid light-sensing wavelength range refers to the wavelength range with the relative response intensity of said light sensing device less than 20%, wherein the relative response intensity of said light sensing device decreases progressively from 630 nm to 700 nm; and the slope of the line connecting the point with 90% relative response intensity and the one with 10% will be less than −0.01067.

2. The ambient light sensing method of claim 1, wherein said valid light-sensing wavelength range refers to the wavelength range with the relative response intensity of said light sensing device greater than 50%; and said invalid light-sensing wavelength range refers to the wavelength range with the relative response intensity of said light sensing device less than 10%.

3. The ambient light sensing method of claim 2, wherein said relative response intensity means the ratio between the light response intensity sensed by said light sensing device and the sensing result of said light sensing device when the light does not pass said optical filter.

4. The ambient light sensing method of claim 2, wherein said valid light-sensing wavelength range of said light sensing device includes 400 nm to 690 nm.

5. An ambient light sensing method, comprising:
a light sensing device sensing the light passing through an optical filter and giving an optical signal value; and
an operational unit receiving said optical signal value and calculating an ambient light illuminance value according to said optical signal value;
where said optical filter is disposed to make a valid light-sensing wavelength range of said light sensing device include 450 nm to 690 nm and an invalid light-sensing wavelength range of said light sensing device be above 700 nm, wherein said valid light-sensing wavelength range refers to the wavelength range with the relative response intensity of said light sensing device greater than 40%; and said invalid light-sensing wavelength range refers to the wavelength range with the relative response intensity of said light sensing device less than 20%, wherein the relative response intensity of said light sensing device decreases progressively from 630 nm to 700 nm; and the wavelength with 90% relative response intensity and the one with 10% relative response intensity differ by less than 75 nm.

6. An ambient light sensor, comprising:
a light sensing unit, including a light sensing device and an optical filter, said optical filter covering the light receiving region of said light sensing device, and said light sensing device sensing the light passing through said optical filter and giving an optical signal value; and
an operational unit, coupled to said light sensing device for receiving said optical signal value and calculating an ambient light illuminance value according to said optical signal value;
where said optical filter is disposed to make a valid light-sensing wavelength range of said light sensing device include 450 nm to 690 nm and an invalid light-sensing wavelength range of said light sensing device be above 700 nm, wherein said valid light-sensing wavelength range refers to the wavelength range with the relative response intensity of said light sensing device greater than 40%; and said invalid light-sensing wavelength range refers to the wavelength range with the relative response intensity of said light sensing device less than 20%, wherein the relative response intensity of said light sensing device decreases progressively from 630 nm to 700 nm; and the slope of the line connecting the point with 90% relative response intensity and the one with 10% will be less than −0.01067.

7. The ambient light sensor of claim 6, wherein said valid light-sensing wavelength range refers to the wavelength range with the relative response intensity of said light sensing device greater than 50%; and said invalid light-sensing wavelength range refers to the wavelength range with the relative response intensity of said light sensing device less than 10%.

8. The ambient light sensor of claim 7, wherein said relative response intensity means the ratio between the light response intensity sensed by said light sensing device and the sensing result of said light sensing device when the light does not pass said optical filter.

9. The ambient light sensor of claim 7, wherein said valid light-sensing wavelength range of said light sensing device includes 400 nm to 690 nm.

10. An ambient light sensor, comprising:
a light sensing unit, including a light sensing device and an optical filter, said optical filter covering the light receiving region of said light sensing device, and said light sensing device sensing the light passing through said optical filter and giving an optical signal value; and
an operational unit, coupled to said light sensing device for receiving said optical signal value and calculating an ambient light illuminance value according to said optical signal value;
where said optical filter is disposed to make a valid light-sensing wavelength range of said light sensing device include 450 nm to 690 nm and an invalid light-sensing wavelength range of said light sensing device be above 700 nm, wherein said valid light-sensing wavelength range refers to the wavelength range with the relative response intensity of said light sensing device greater than 40%; and said invalid light-sensing wavelength range refers to the wavelength range with the relative response intensity of said light sensing device less than 20%, wherein the relative response intensity of said light sensing device decreases progressively from 630 nm to 700 nm; and the wavelength with 90% relative response intensity and the one with 10% relative response intensity differ by less than 75 nm.

* * * * *